United States Patent [19]

Bruns et al.

[11] Patent Number: 5,149,405
[45] Date of Patent: Sep. 22, 1992

[54] FOUR-AXIS ECM MACHINE AND METHOD OF OPERATION

[75] Inventors: Norbert A. Bruns, Cincinnati, Ohio; Richard F. Fussner, Brookville, Ind.; John S. Reynolds, Maineville, Ohio

[73] Assignee: Lehr Precision Inc., Cincinnati, Ohio

[21] Appl. No.: 706,059

[22] Filed: May 28, 1991

[51] Int. Cl.$^5$ .................. B23H 3/04; B23H 3/10; B23H 7/26; B23H 9/12
[52] U.S. Cl. .................. 204/129.1; 204/129.7; 204/224 M; 204/225; 204/275; 204/297 R
[58] Field of Search ............ 204/129.1, 224 M, 225, 204/297 R, 286, 275, 129.7

[56] References Cited

U.S. PATENT DOCUMENTS

| | | | |
|---|---|---|---|
| 3,466,235 | 9/1969 | Williams | 204/224 M |
| 3,515,659 | 6/1970 | Broat et al. | 204/224 M |
| 3,723,268 | 3/1973 | Johns et al. | 204/129.1 |
| 4,052,284 | 10/1977 | Schrader | 204/224 M |
| 4,057,475 | 11/1977 | Schrader | 204/129.1 |
| 4,256,555 | 3/1981 | Wilson et al. | 204/129.5 |
| 4,468,304 | 8/1984 | Hill | 204/129.6 |
| 4,657,649 | 4/1987 | Hinman | 204/224 M |
| 4,851,090 | 7/1989 | Burns et al. | 204/129.7 |
| 4,999,093 | 3/1991 | Moracz | 204/129.1 |

*Primary Examiner*—Donald R. Valentine
*Attorney, Agent, or Firm*—Francis L. Conte

[57] ABSTRACT

A machine for electrochemically machining (ECM) a workpiece having a stacking axis and first and second opposite sides includes a pair of cathode tools. The first and second tools have first and second longitudinal axes, respectively, disposed substantially perpendicularly to the workpiece stacking axis. The first and second tools also include the first and second transverse axes, respectively, disposed perpendicularly to the first and second longitudinal axes, respectively, and substantially parallel to the workpiece stacking axis. The machine is effective for practicing an improved method of moving the first and second tools along the first and second longitudinal axes and along the first and second transverse axes, respectively, toward the workpiece for the electrochemical machining thereof. By moving the respective cathode tools along both longitudinal and transverse axes, a selectively variable resultant feedrate direction is obtained which is inclined relative to the workpiece stacking axis.

25 Claims, 10 Drawing Sheets

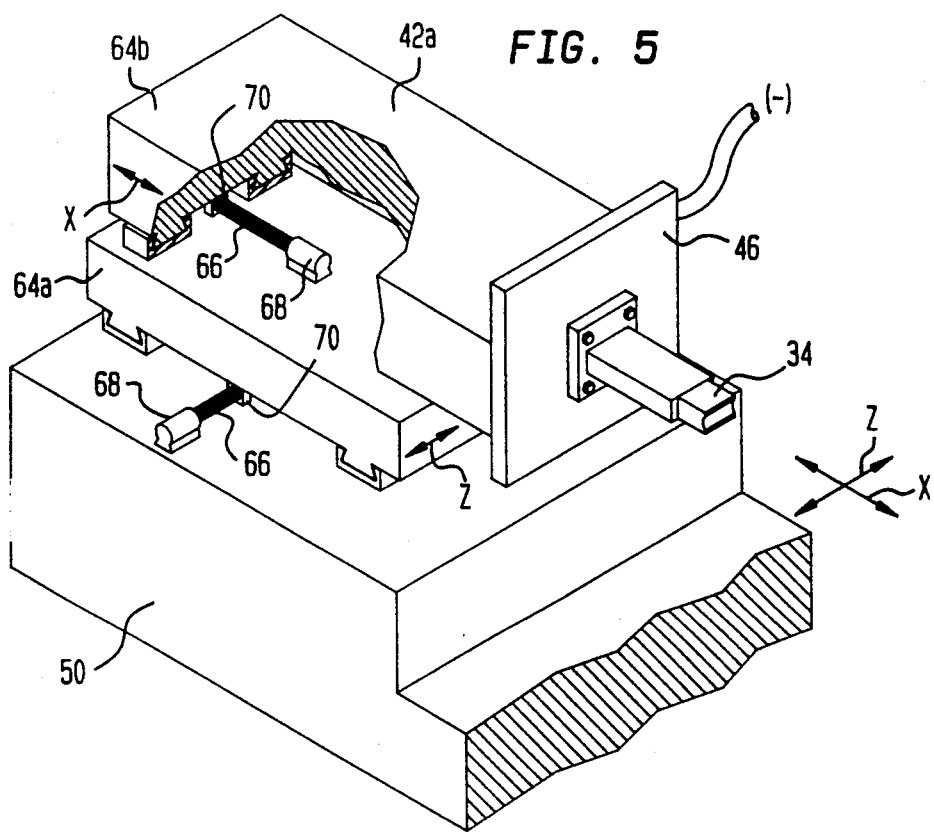
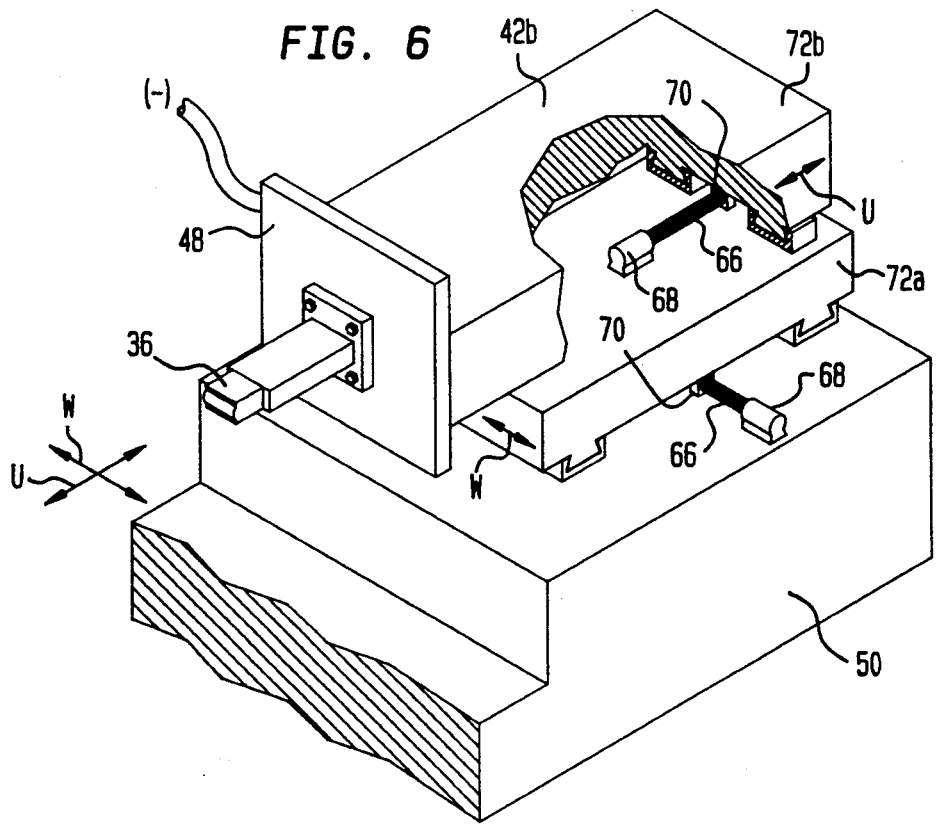

FOUR-AXIS ECM MACHINE AND METHOD OF OPERATION

TECHNICAL FIELD

The present invention relates generally to electrochemically machining of metallic parts, and, more specifically, to electrochemically machining a part having a transversely extending platform, such as a gas turbine engine airfoil including a platform.

BACKGROUND ART

Electrochemical machining (ECM) is a conventional process in which a workpiece is provided with a positive voltage to create an anode, and a pair of tools is provided with a negative voltage to create a cathode. DC voltages between about 5–25 volts and up to about 15,000 amps, or more, are typically used, and may be steady-state or pulsed. An electrolyte at pressures up to about 300 psi (21 kg/cm$^2$) is channeled in the space or gap between the workpiece and the tools for electrochemically machining the workpiece.

The prior art includes various methods and apparatus for electrochemically machining airfoil blades, either individually on a single workpiece, or in multiples from a workpiece bar. Leading and trailing edges of an airfoil blade are especially difficult to electrochemically machine precisely, and the prior art teaches various apparatus therefor. Furthermore, with an airfoil blade having a transversely extending platform, the simultaneous electrochemical machining of both the airfoil and the platform is also especially difficult to accomplish, and the prior art teaches various apparatus therefor.

For example, the airfoil and platform may be electrochemically machined simultaneously by using cathode tools each having a feed axis inclined at an acute angle to the radial stacking axis of the blade, for example at about 60° thereto. The included angle between the two, opposing, cathode tools is therefore about 120°. During electrochemically machining, the two tools are moved toward the workpiece along the feed axes, and since the feed axes are inclined, the tools move both toward the airfoil of the blade and the platform of the blade for simultaneously electrochemically machining both.

The blade platforms may be disposed substantially perpendicularly to the blade stacking axis or may be inclined thereto. A gas turbine engine airfoil may be in the form of a rotor blade or a stationary stator vane, with the blade typically having a single platform at the root end thereof, with the vane typically having platforms at both the root and tips thereof.

Accordingly, in order to precisely electrochemically machine substantially the entire airfoil from leading edge to trailing edge, from root to tip, and along the platform or platforms, conventional ECM machines vary in degree of complexity and require the inclined feed axes for the simultaneous electrochemical machining of both the airfoil and the platform. However, with a stator vane having both root and tip platforms, electrochemical machining thereof must typically be accomplished in two steps in view of tool access limitations, firstly electrochemically machining a majority of the airfoil and one of the platforms, and then machining the remaining platform and airfoil adjacent thereto.

Typical prior art ECM machines include the cathode tools having inclined feed axes usually at only one angle of inclination. In order to change the angle of inclination of the feed axes for electrochemically machining either an individual airfoil in two steps, for example a stator vane having two platforms, or to machine variously configured airfoil blades, either different ECM machines having different inclination angles must be used, or an ECM machine must be physically reconfigured at the desired inclination angles. For example, the cathode tools, including their moving apparatus, may be reconfigured for varying their inclination axes. However such machines are relatively complex, and the reconfiguration process requires set up time and typically the use of hoists for lifting the heavy tool moving apparatus.

Furthermore, typical ECM machines are relatively complex and provide access to the workpiece from typically one side only. The remaining sides surrounding the workpiece typically include either actuation mechanisms or large frames for supporting the various components of the machine.

Yet further, typical ECM machines provide various, complex arrangements for sealing the electrolyte channeled over the workpiece for preventing undesirable leakage thereof or undesirable stray electrochemical machining of components adjacent to the workpiece, or both.

OBJECTS OF THE INVENTION

Accordingly, one object of the present invention is to provide a new method and apparatus for electrochemically machining a workpiece having a transversely extending platform.

Another object of the present invention is to provide an improved ECM machine effective for simply varying the feed direction of a cathode tool relative to the workpiece.

Another object of the present invention is to provide an improved ECM machine having independently controllable cathode tools for obtaining different feed motion thereof.

Another object of the present invention is to provide an improved ECM machine having a flowbox for accommodating movement of the cathode tools while sealing leakage of electrolyte from the flowbox.

DISCLOSURE OF INVENTION

A machine for electrochemically machining (ECM) a workpiece having a stacking axis and first and second opposite sides includes a pair of cathode tools. The first and second tools have first and second longitudinal axes, respectively, disposed substantially perpendicularly to the workpiece stacking axis. The first and second tools also include first and second transverse axes, respectively, disposed perpendicularly to the first and second longitudinal axes, respectively, and substantially parallel to the workpiece stacking axis. The machine is effective for practicing an improved method of moving the first and second tools along the first and second longitudinal axes and along the first and second transverse axes, respectively, toward the workpiece for the electrochemical machining thereof. By moving the respective cathode tools along both longitudinal and transverse axes, a selectively variable resultant feedrate direction is obtained which is inclined relative to the workpiece stacking axis.

BRIEF DESCRIPTION OF DRAWINGS

The novel features believed characteristic of the invention are set forth and differentiated in the claims.

The invention, in accordance with preferred and exemplary embodiments, together with further objects and advantages thereof, is more particularly described in the following detailed description taken in conjunction with the accompanying drawings in which:

FIG. 5 is a perspective, partly sectional view of one embodiment of means for translating a first cathode tool of the machine illustrated in FIGS. 3 and 4 along two axes.

FIG. 6 is a perspective, partly sectional view of one embodiment of means for translating a second cathode tool of the machine illustrated in FIGS. 3 and 4 along two axes.

MODE(S) FOR CARRYING OUT THE INVENTION

Figure 1:
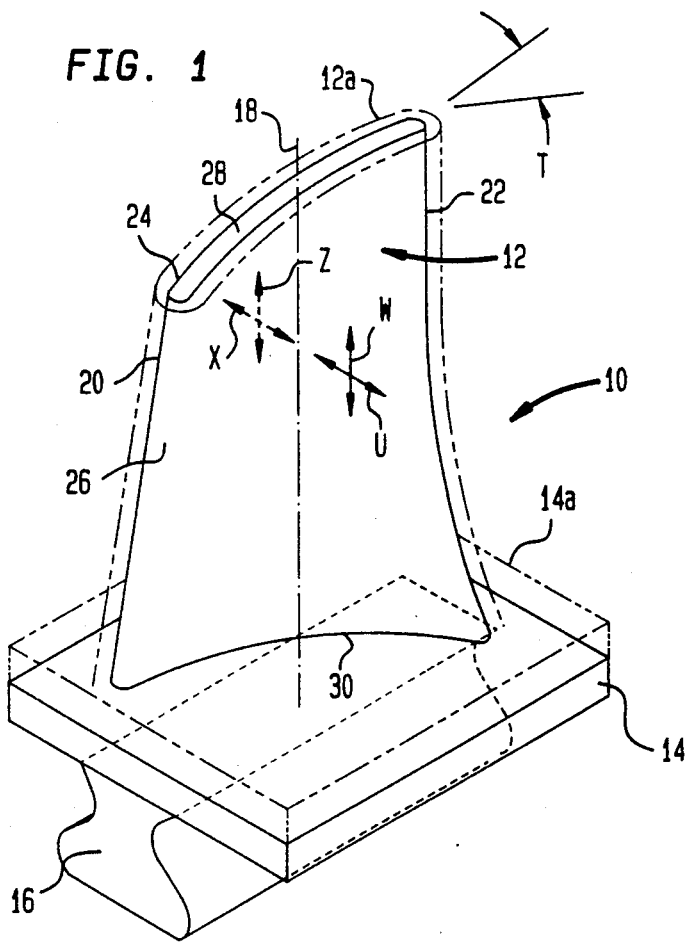
FIG. 1 is a perspective, schematic representation of an exemplary workpiece in the form of a gas turbine engine rotor blade.

Illustrated in FIG. 1 is an exemplary workpiece 10 in the form of a gas turbine engine rotor blade having a conventional airfoil 12, platform 14, and dovetail 16. The workpiece 10 could also be in the form of a conventional gas turbine engine stator vane (not shown) having a single platform, or a pair of spaced platforms as is conventionally known. Or, the workpiece 10 may be any other type of component having a portion, such as the platform 14, extending transversely to a second portion, such as the airfoil 12.

The exemplary blade 10 has a conventional longitudinal stacking axis 18 which is typically straight and represents the locus of the centers of gravity of the various transverse sections of the blade extending along the axis 18. The stacking axis is generally parallel to a radial axis when installed in a gas turbine engine, and need not be straight, but may be bowed. In this exemplary embodiment, the platform 14 is disposed substantially perpendicularly to the stacking axis 18, but in an alternate embodiment of the workpiece 10 it may be inclined thereto at angles less than 90°. The blade 10 includes a conventional leading edge 20, trailing edge 22, and first and second opposite sides 24 and 26 extending therebetween. In this exemplary embodiment, the first side 24 is generally convex, and the second side 26 is generally concave. The airfoil 12 includes a conventional tip 28, and a conventional root 30 which is joined to the platform 14 at a conventional fillet radius. The airfoil 12 typically twists from the root 30 to the tip 28 at a twist angle T of up to about 40°.

In order to electrochemically machine (ECM) the airfoil 12 and the platform 14 of the blade 10, these portions of the blade 10 are conventionally provided with an oversize of material typically about 30–50 mils (0.76-1.27 mm) as shown in phantom line designated 12a and 14a, respectively. The workpiece 10 may be formed from bar stock, or from a forging, or from any other suitable conventional source. Electrochemical machining of the oversized airfoil 12a and platform 14a will result in the finally formed, or finally dimensioned, airfoil 12 and platform 14 illustrated in solid line in FIG. 1.

Figure 2:
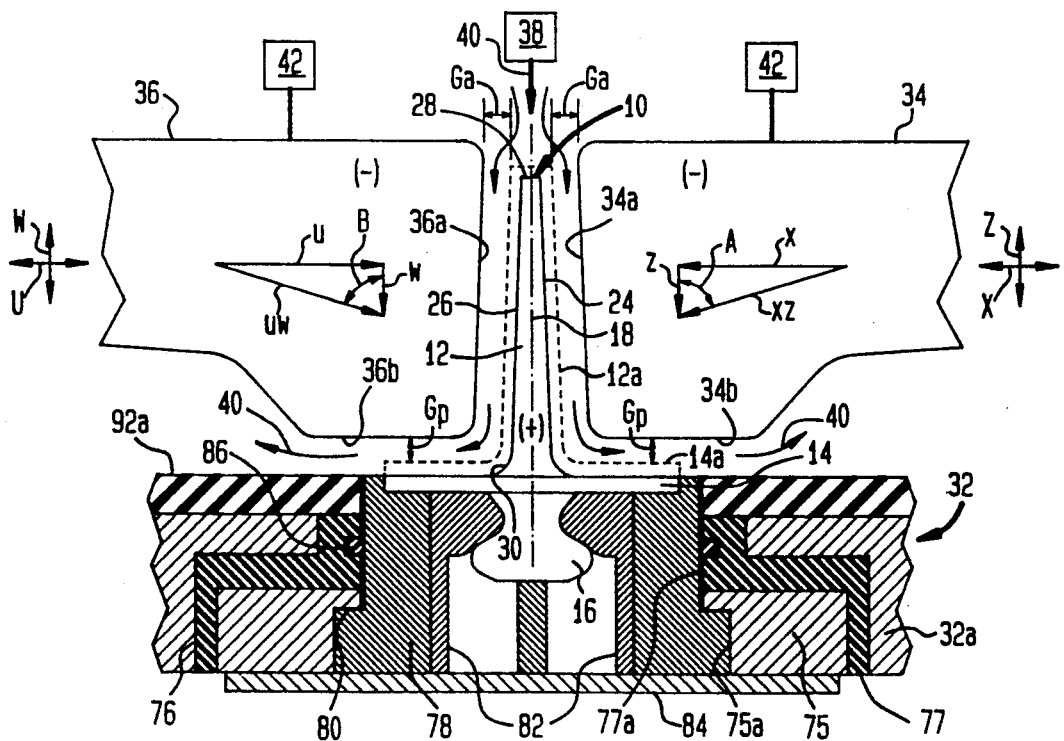
FIG. 2 is a schematic representation, partly in section, of a portion of an electrochemical machine in accordance with one embodiment of the present invention effective for machining the exemplary workpiece illustrated in FIG. 1.

As illustrated schematically in FIG. 2, means in the form of a flowbox 32 (only a portion of which is shown) are provided for fixedly mounting the blade 10 stationary in space. A pair of cathode tools including a first cathode tool 34 and a second cathode tool 36 are disposed on opposite sides of the airfoil 12. The first tool 34 includes a first longitudinal axis X, and a first transverse axis Z disposed perpendicularly thereto. The second tool 36 includes a second longitudinal axis U, and a second transverse axis W disposed perpendicularly thereto.

In accordance with one embodiment of the present invention, the tools 34, 36 are translated along both the respective longitudinal and transverse axes X, Z and U, W. And, the first and second longitudinal axes X and U are preferably disposed perpendicularly to the workpiece stacking axis 18, and the first and second transverse axes are preferably disposed parallel to the stacking axis 18 as described in more detail below.

The first tool 34 includes a conventional first workface 34a disposed generally perpendicularly to the first longitudinal axis X which is complementary in shape to the blade first surface 24 for the electrochemical machining thereof. A conventional first platform workface 34b is formed integrally with the first airfoil workface 34a and extends generally parallel to the first longitudinal axis X for electrochemically machining the platform 14 on the first side 24 of the blade 10.

Similarly, the second tool 36 includes a conventional second airfoil workface 36a shaped complementary to the blade second side 26 for the electrochemical machining thereof, and a conventional second platform workface 36b formed integrally with the second airfoil workface 36a and extending generally parallel to the second longitudinal axis U.

The first and second tools 34 and 36 are initially positioned adjacent to the respective first and second sides 24, 26 of the blade 10 for forming respective gaps $G_a$ between the first and second airfoil workfaces 34a, 34b and the first and second sides 24, 26 of the oversized airfoil 12a. The first and second platform workfaces 34a and 34b are initially spaced transversely away from the oversized platform 14a to define platform gaps $G_p$ therebetween.

Means 38 for channeling a conventional electrolyte between the blade 10 and the first and second tools 34, are provided for electrochemically machining the blade 10. Means are also provided as described below for supplying a positive voltage to the blade 10, as indicated by the plus sign (+), for forming an anode, and a negative voltage, or a reference or ground voltage, to the first and second tools 34, 36, as indicated by the negative sign (−). The applied voltage may range from about 5–25 volts DC at current values up to about 15,000 amps, or more, with about half of the current being channeled through each of the tools 34, 36. As the electrolyte 40 flows between the airfoil gaps $G_a$ and the platform gaps $G_p$, metal is electrochemically machined from the oversized airfoil 12a and the platform 14a as is conventionally known.

In order to simultaneously electrochemically machine both the airfoil 12 and the platform 14, conventional cathode tools have single feed axes inclined relative to the stacking axis 18 so that the airfoil workfaces 34a, 36a approach the airfoil 12 simultaneously with the platform workfaces 34b, 36b approaching the platform 14. However, in accordance with the present invention, the first and second tools 34, 36 do not each have a single, structurally limited, inclined feed axis, but instead means 42 are provided for moving the first and second tools 34, 36 along both the first and second longitudinal axes X, U, respectively, and along the first and second transverse axes Z, W, respectively, toward the blade 10 during operation for simultaneously electrochemically machining both the airfoil 12 and the platform 14.

More specifically, the moving means 42 are effective for translating independently the first and second tools 34, 36 along the first and second longitudinal axes X, U, respectively, and independently along the first and second transverse axes Z, W, respectively. The first tool 34 is translated linearly (i.e. along a straight line) along the first longitudinal axis X toward the airfoil 12 at a selectively variable first longitudinal feedrate vector x and preferably perpendicular to the stacking axis 18, as well as being translated linearly along the first transverse axis Z toward the platform 14 at a selectively variable first transverse feedrate vector z and preferably parallel to the stacking axis 18. The feedrate vectors x and z are variable solely in magnitude, with the directions thereof being fixed, and remaining always preferably perpendicular to each other. However, the motion of the two feedrate vectors x and z combines for forming a resultant feedrate vector xz which is disposed at a feed inclination, or approach, angle A relative to both the first transverse axis Z and the stacking axis 18.

Accordingly, the first tool 34 will follow the path of the resultant vector xz toward the blade 10 with the first airfoil workface 34a approaching the airfoil first side 24, and the first platform workface 34b approaching the platform 14. By varying the respective longitudinal and transverse feedrate vectors x and z, the effective feedrate inclination angle, as represented by the angle A of the resultant feedrate vector xz, may be selectively varied.

Similarly, the moving means 42 are effective also for translating linearly the second tool 36 along the second longitudinal axis U at a selectively variable second longitudinal feedrate vector u toward the airfoil 12 and preferably perpendicular to the stacking axis 18. The second tool 36 is also translated linearly along the second transverse axis W at a selectively variable second transverse feedrate vector w toward the platform 14 and preferably parallel to the stacking axis 18. The longitudinal and transverse feedrate vectors u and w are also variable solely in magnitude with the direction thereof always remaining fixed and preferably perpendicular to each other to similarly effect a resultant feedrate vector uw which similarly has a feed inclination, or approach, angle B relative to the second transverse axis W and the stacking axis 18.

In the preferred embodiment of the present invention, the first and second longitudinal axes X and U are preferably parallel to each other as well as being colinear. The first and second transverse axes Z and W are preferably parallel to each other. The first and second tools 34, 36 are translated along the first and second longitudinal axes X, U, respectively, toward the airfoil 12 to electrochemically machine the airfoil 12, and are also translated along the first and second transverse axes Z and W, respectively, toward the platform 14 to electrochemically machine the platform 14. The motion of the first and second tools 34 and 36 along the first and second longitudinal axes X, U, respectively, is preferably coordinated and occurs substantially simultaneously by the moving means 42. Similarly, translation of the first and second tools 34, 36 along the first and second transverse axes Z, W, respectively, is also coordinated and occurs substantially simultaneously by the moving means 42.

Since the moving means 42 are effective for independently translating the first and second tools 34, 36 along each of the first and second longitudinal axes X, U, and along each of the first and second transverse axes Z, W, this "axis-on-an-axis" approach provides substantial flexibility in controlling the approach angles A, B of the tools 34, 36 relative to the stacking axis 18 of the blade 10. The individual tools 34, 36 may be independently brought into starting positions adjacent to the airfoil first and second sides 24, 26 and the platform 14, and may move independently toward the airfoil 12 and the platform 14 during electrochemical machining. They may also be independently retracted away from the airfoil 12 and the platform 14 upon completion of electrochemical machining thereof.

Furthermore, the starting values of the two airfoil gaps $G_a$ and the two platform gaps $G_p$ may be equal, respectively, or may be unequal as desired for initially offsetting the respective tools 34, 36 along either the stacking axis 18, or transversely thereto, or both as desired. Yet further, the longitudinal feedrate vectors x and u may be equal or unequal as desired, and the transverse feedrate vectors z and w may also be equal or unequal as desired. In one embodiment of the present invention, transverse translation of the first and second tools 34, 36 occurs at substantially equal feedrates, wherein the feedrate vector z equals the feedrate vector w, with the approach angles A and B being substantially equal to each other for electrochemically machining a blade 10 having a substantially uniform thickness platform 14 disposed substantially perpendicularly to the stacking axis 18. If the platform 14 has a varying longitudinal thickness or is inclined at angles less than 90° relative to the stacking axis 18, the respective feedrate vectors x, u, z, and w, may be selected as desired for ensuring desired electrochemical machining thereof.

Accordingly, the present invention allows for relatively simple variation of the approach angles A, B by varying the respective feedrate vectors x, z, and u, w, and therefore provides a substantial improvement over a conventional electrochemical machine having a fixed, single approach angle of the electrode tool relative to the blade to be machined.

In accordance with one embodiment of the present invention, an improved method of electrochemically machining the blade 10 includes the steps of supplying a positive voltage to the blade 10 while providing a negative voltage to the first and second tools 34, 36, and channeling the electrolyte 40 between the blade 10 and the first and second tools 34, 36 for electrochemically machining the blade 10, and, more specifically, the airfoil 12 and the platform 14. The method also includes the step of moving the first and second tools 34, 36 along the first and second longitudinal axes X, U, respectively, toward the airfoil 12 and substantially perpendicularly to the stacking axis 18, and along the first and second transverse axes Z, W, respectively, toward the platform 14 and substantially parallel to the stacking axis 18 during the electrochemical machining operation for electrochemically machining the airfoil 12 and the platform 14 of the blade 10. In a preferred embodiment of the invention, the electrolyte 40 is channeled along the stacking axis 18 over the blade 10 from the tip 28 over the airfoil 12, including the first and second sides 24, 26 and the leading and trailing edges 20, 22, and toward the platform 14. The electrolyte 40 is then turned outwardly from the stacking axis 18 by the platform 14 generally along the longitudinal axes X and U.

Figure 3:
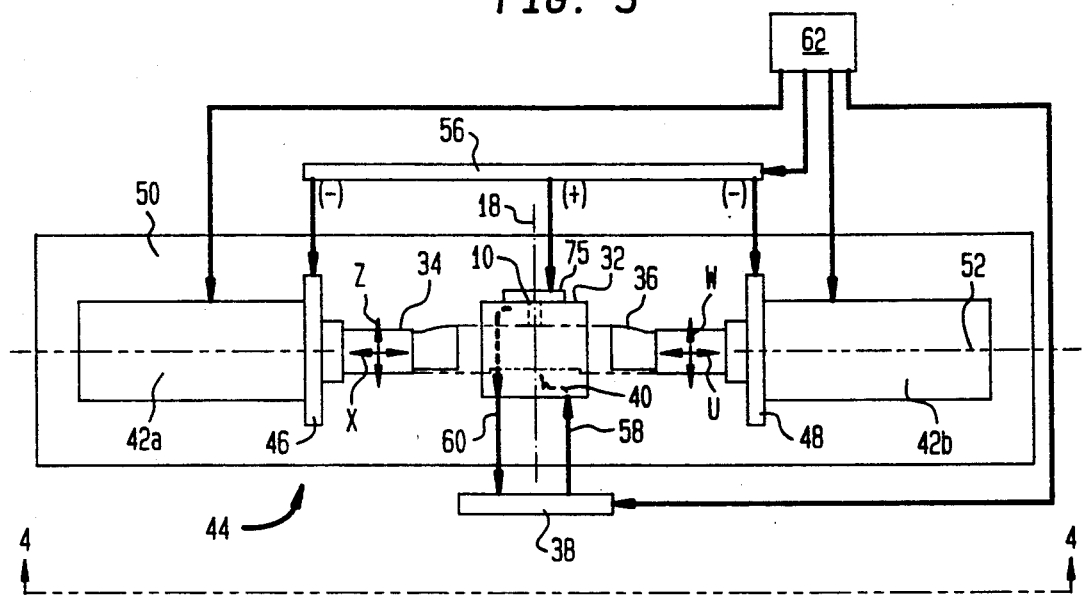
FIG. 3 is a schematic plan view of one embodiment of the ECM machine illustrated in FIG. 2.
Figure 4:
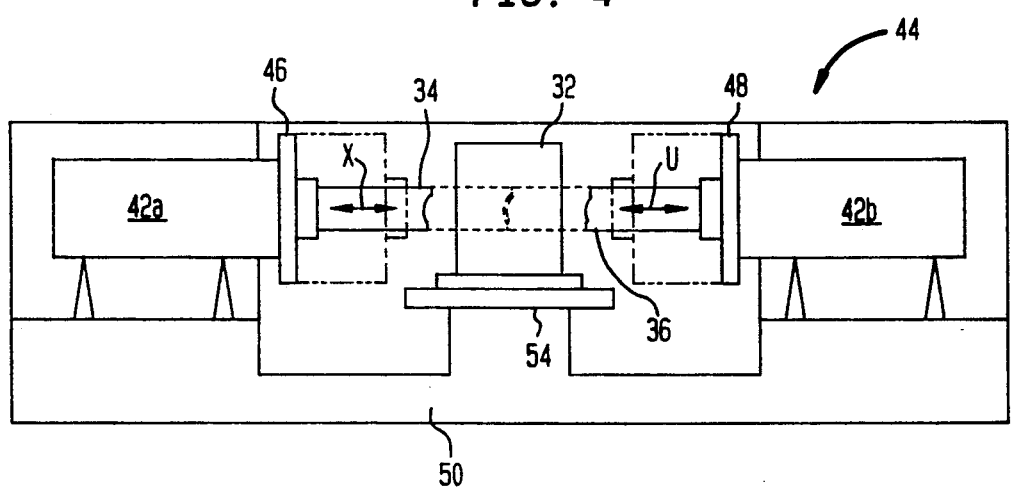
FIG. 4 is a longitudinal, elevation back view of the ECM machine illustrated in FIG. 3 taken along line 4—4.

Illustrated in FIGS. 3 and 4 is an exemplary ECM machine 44 effective for practicing the method invention as described above with respect to FIG. 2. The moving means 42 illustrated in FIG. 2 are shown schematically in FIG. 3 as including a first cross-slide 42a having a first face, or ram, plate 46 movable along the first longitudinal and transverse axes X, Z, with the first tool 34 being conventionally fixedly mounted thereto for movement therewith. The moving means 42 also include a second cross-slide 42b having a second ram, or face, plate 48 movable along the second longitudinal and transverse axes U, W, with the second tool 36 being conventionally fixedly mounted thereto for movement therewith.

The first and second cross-slides 42a, 42b are fixedly mounted to a structural frame 50 on opposite sides of the workpiece 10 and are preferably longitudinally aligned so that the first and second longitudinal axes X, U are aligned parallel to a longitudinal centerline axis 52 of the machine 44 and generally colinearly therewith.

The machine 44 also includes a flat, reference or support table 54 fixedly mounted to the frame 50 and disposed between the first and second cross-slides 42a, 42b which provides a reference datum for mounting the blade 10 for electrochemical machining by the first and second tools 34, 36. The flowbox 32 is conventionally fixedly mounted to the reference table 54, by bolts for example, and the blade 10 is fixedly joined thereto as described in more detail below.

The voltage supplying means is conventional and includes a conventional power supply 56 conventionally electrically connected through suitable electrical cables to the first and second tools 34, 36, and to the blade 10 for providing suitable current with a positive voltage to the blade 10 and a negative voltage to the first and second tools 34, 36. In the preferred embodiment, negative power cables ($-$) are attached to the ram plates 46, 48, as shown in FIGS. 5-8, to which the electrically conductive tools 34, 36 are joined. And, positive power is provided to the blade 10 as described below.

The electrolyte channeling means 38 is also conventional and provides the electrolyte 40 to the flowbox 32 through a supply conduit 58, with the electrolyte 40 being returned to the channeling means 38 through a return conduit 60. The channeling means 38 are effective for supplying the electrolyte 40 at a suitable pressure, such as for example 100 to 300 psi (7 to 21 kg/cm$^2$), into the flowbox 32 while returning the electrolyte 40 therefrom through the return conduit 60 while maintaining a selectable back pressure thereon as is conventionally known.

A conventional controller 62, in the form of a conventional computer numerical controller, is conventionally electrically connected to the first and second cross-slides 42a, 42b, the power supply 56, and the electrolyte channeling means 38 for predeterminedly controlling the various operations thereof.

In particular, the controller 62 is effective for independently controlling the feedrates of the first and second tools 34, 36 along each of the separate first and second longitudinal axes X, U, and along each of the first and second transverse axes Z, W, with coordinated and substantially simultaneous movement thereof as desired, and as described above for obtaining desired resultant feedrate vectors xz, and uw. The controller 62 operates in a conventional manner to control the movement of the tools 34, 36, and preferably includes conventional automatic feedback control for continually adjusting the resultant feedrate vectors xz and uw from preprogrammed nominal paths.

In the embodiment of the invention illustrated in FIGS. 3 and 4, the flowbox 32 is accessible from both transverse, or front and back, sides of the machine 44 which allows relatively easy access by the operator thereof. This is due, in part, to the preferred use of the first and second cross-slides 42a, 42b on opposite longitudinal sides of the flowbox 32.

In an exemplary embodiment of the invention as illustrated in FIGS. 5 and 6, the first cross-slide 42a includes a first transverse ram, or slide, 64a conventionally slidably mounted to the frame 50 and movable along the first transverse axis Z, and a first longitudinal ram 64b conventionally slidably mounted to the top of the first transverse ram 64a and movable along the first longitudinal axis X. The first ram plate 46 is conventionally fixedly mounted to an end of the first longitudinal rams 64b. The first transverse and longitudinal rams 64a, 64b are conventionally translatable by conventional screws 66 selectively rotatable either clockwise or counter-clockwise by conventional motor drives 68 conventionally electrically joined to the controller 62 (as shown in FIG. 3), with the screws 66 passing through conventional nuts 70 fixedly joined to the respective rams 64a, 64b. Upon rotation of the screws 66, the rams 64a, 64b are caused to translate along the transverse and longitudinal axes Z, X, respectively, in a conventional fashion. The first ram plate 46, and in turn the first tool 34 joined thereto, are therefore selectively movable along both the longitudinal and transverse axes X, Z for obtaining any desired resultant feedrate vector xz as shown in FIG. 2.

Similarly, the second cross-slide 42b is substantially identical to the first cross-slide 42a and includes a second transverse ram 72a conventionally slidably mounted to the frame 50 and movable along the second transverse axis W, and a second longitudinal ram 72b conventionally slidably mounted to the top of the second transverse 72a and movable along the second longitudinal axis U. The second ram plate 48 is conventionally fixedly mounted to an end of the second longitudinal ram 72b. The second transverse and longitudinal rams 72a, 72b are similarly actuated by the conventional screws 66, motor drives 68, and nuts 70, with the motor drives 68 being conventionally electrically connected to the controller 62 (as shown in FIG. 3). The second ram plate 48, and in turn the second tool 36, are accordingly selectively movable along both the longitudinal and transverse axes U, W for obtaining any desired resultant feedrate vector uw as shown in FIG. 2.

Figure 7:
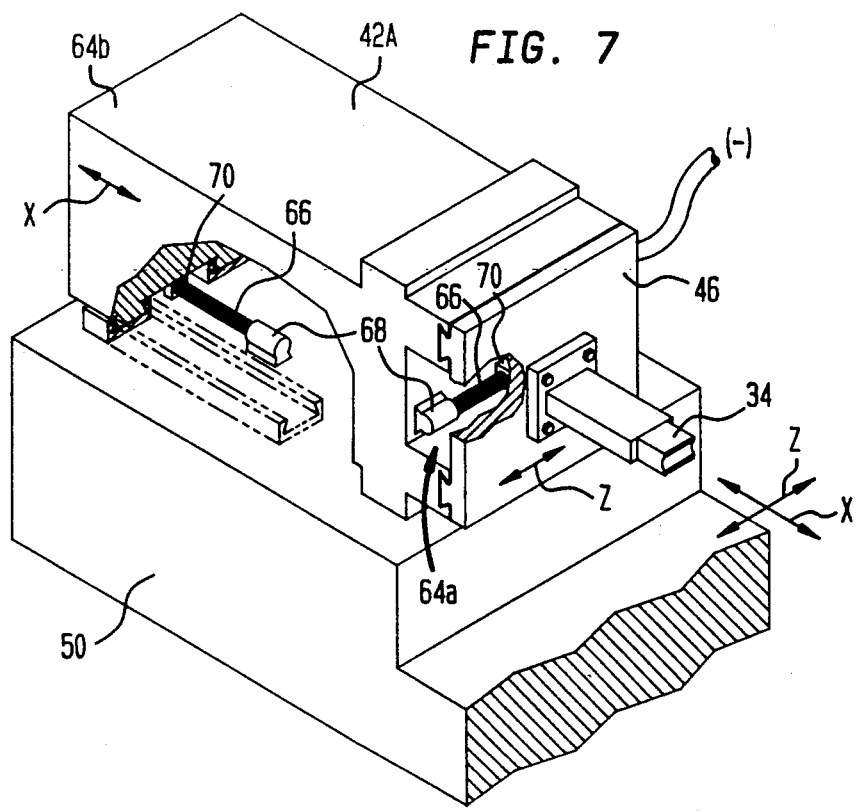
FIG. 7 is a perspective, partly sectional view of another embodiment of means for translating the first cathode tool of the machine illustrated in FIGS. 3 and 4 along two axes.
Figure 8:
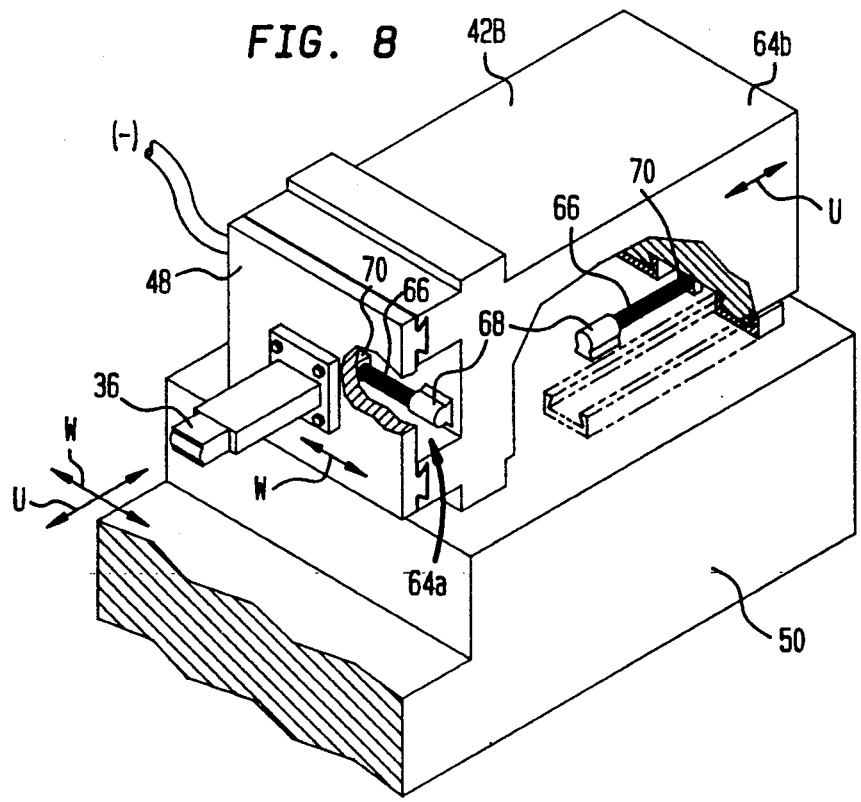
FIG. 8 is a perspective, partly sectional view of another embodiment of means for translating the second cathode tool of the machine illustrated in FIGS. 3 and 4 along two axes.

An alternate embodiment of the moving means 42 is illustrated in FIGS. 7 and 8 and includes a first cross-slide designated 42A which is generally identical to the first cross-slide 42a illustrated in FIG. 5 except that the first longitudinal ram 64b is conventionally slidably mounted to the frame 50 and is movable along the first longitudinal axis X, and the first transverse ram 64a is in the form of the base of the first ram plate 46 being conventionally slidably mounted to an end of the first longitudinal ram 64b, with the first ram plate 46 being, therefore, fixedly mounted, or integral, to the first transverse ram 64a. Accordingly, the first ram plate 46, and in turn, the first tool 34 are selectively movable along the first longitudinal and transverse axes X, Z, for obtaining the resultant feedrate vector xz as illustrated in FIG. 2.

Similarly, the second cross-slide 42B illustrated in FIG. 8 is substantially identical to the first cross-slide 42A illustrated in FIG. 7 with the second longitudinal ram 72b being conventionally slidably mounted to the frame 50 and movable along the second longitudinal axis U, and the second transverse ram 72a being conventional slidably mounted to the second longitudinal ram 72b and movable along the second transverse axis W. The second transverse ram 72a is in the form of the base of the second ram plate 48 which is therefore fixedly mounted, or integral to the second transverse ram 72a. The second ram plate 48, and in turn, the second tool 36 are selectively movable along the second longitudinal and transverse axes U, W for obtaining the resultant feedrate vector uw as illustrated in FIG. 2 The second transverse and longitudinal rams 72a, 72b are similarly actuated by the screws 66, the motor drive 68, and the nuts 70 in response to the controller 62.

Accordingly, in both of the embodiments of the moving means 42 illustrated in FIGS. 5-8, the first and second tools 34, 36 are independently movable in response to the controller 62 for obtaining the desired resultant feedrate vectors xz and uw, respectively.

Figure 9:
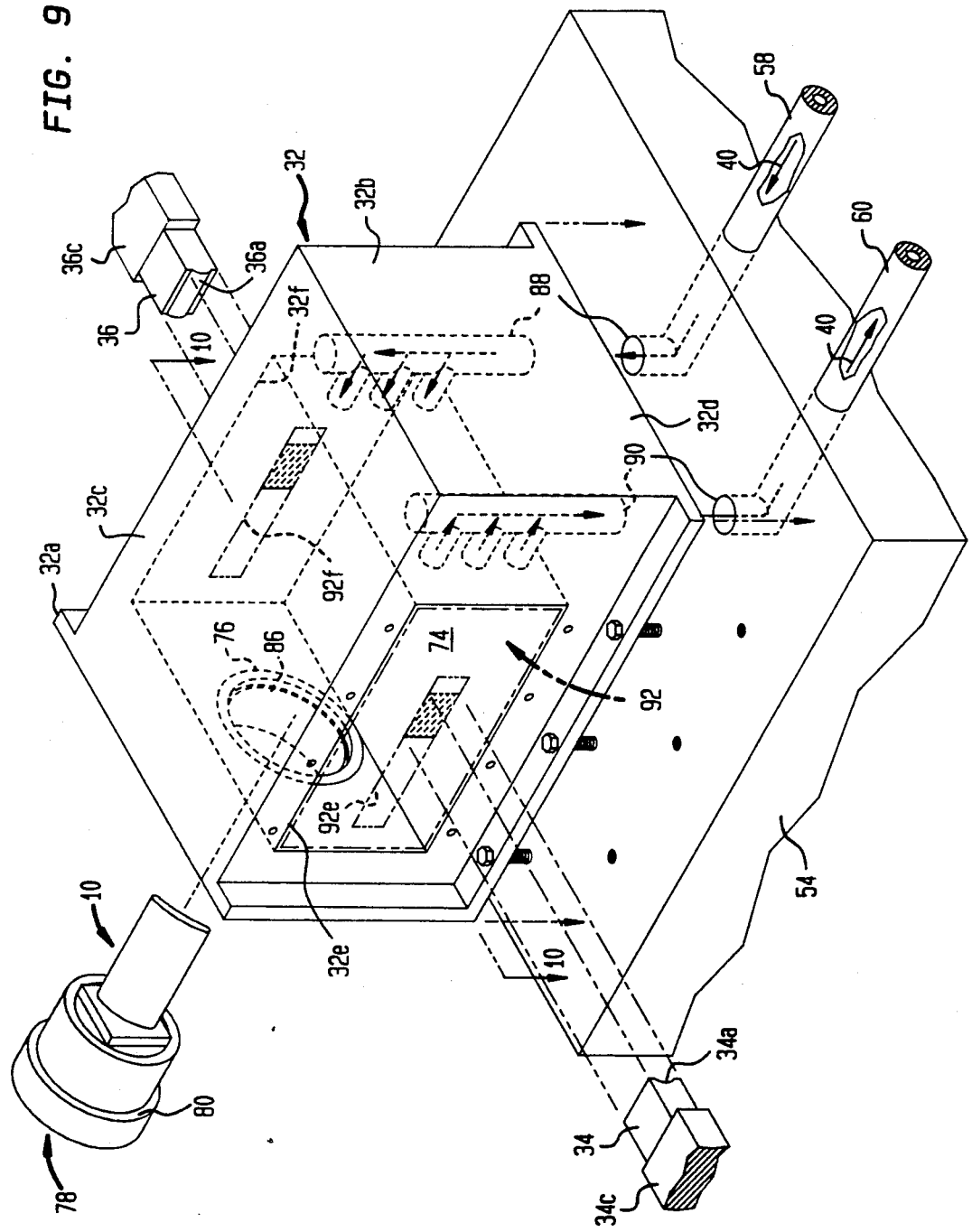
FIG. 9 is an exploded schematic representation of an exemplary flowbox used in the ECM machine in accordance with one embodiment of the present invention.
Figure 10:
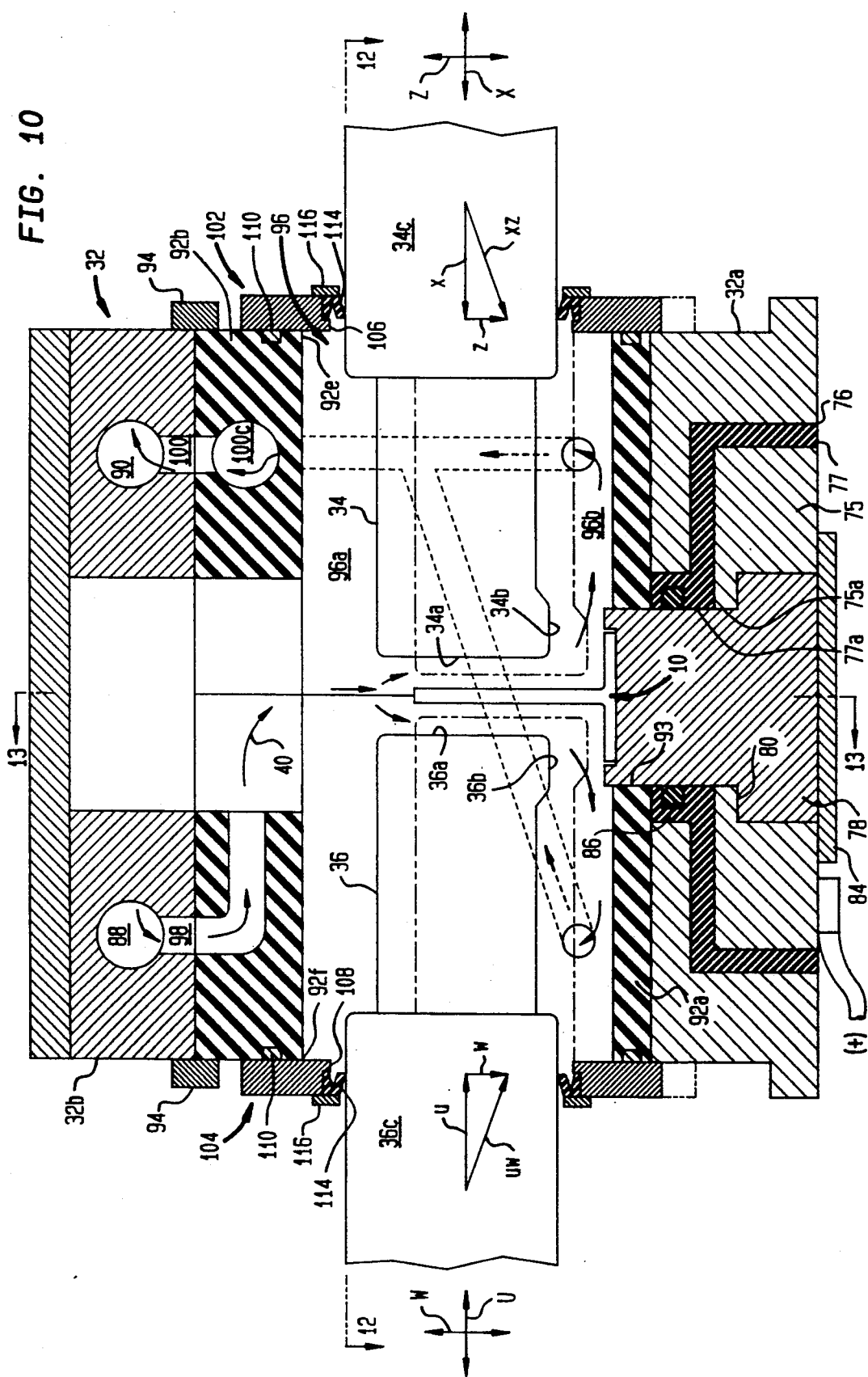
FIG. 10 is a longitudinal sectional view of the flowbox illustrated in FIG. 9 taken along plane 10—10.

Illustrated in more particularity in FIGS. 9 and 10 is the flowbox 32. The flowbox 32 is generally rectangular in form and includes a vertical front wall 32a, a vertical back wall 32b, a horizontal top wall 32c, and a horizontal bottom wall 32d which collectively define a rectangular inner chamber 74 bounded by the inner surfaces thereof. The front wall 32a includes a centrally located front aperture 76 for fixedly supporting the blade 10 in the chamber 74 by any suitable conventional means.

For example, an electrically conductive, annular buss plate 75 is disposed inside the aperture 76 fixedly against a suitable electrical insulator 77, by electrically insulated bolts for example (not shown), for preventing current flow from the buss plate 75 to the flowbox 32. The buss plate 75 is conventionally electrically joined to the power supply 56 (see FIG. 3) by a positive power cable (+) for conducting current through the blade 10.

Referring to FIG. 2, the dovetail 16 of the blade 10 may be inserted in an annular shuttle 78 which has an annular outer flange 80 which abuts a complementary flange formed in a central aperture 75a of the buss plate 75 for precisely locating the blade 10 within the flowbox chamber 74 and for electrically conducting current flow. Suitable grippers 82 are inserted inside the shuttle 78 for capturing the dovetail 16 within the shuttle 78. A retention fixture 84 fixedly secures the shuttle 78 including the blade 10 and the grippers 82 to the buss plate 75, and for example may be bolted thereto. In this way, the blade 10 is securely held by the shuttle 78 and may be inserted through the flowbox front wall 32a and the buss plate 75 inside the flowdam 92, and may be withdrawn therefrom for easy assembly into and disassembly from the ECM machine 44. The shuttle 78 is electrically conductive in the preferred embodiment for electrically joining the blade 10 to the buss plate 75 which is provided with positive power. A conventional O-ring 86 is mounted within a groove inside a central aperture 77a of the insulator 77 for providing a seal against the shuttle 78 to prevent leakage therepast.

Referring again to FIGS. 9 and 10, the flowbox bottom wall 32d is conventionally fixedly joined to the reference table 54 by being bolted thereto, for example. The flowbox 32 is formed of a suitable metal such as stainless steel for providing structural rigidity for fixedly supporting the blade 10 thereto, containing pressure forces due to the high pressure electrolyte 40 channeled therein. The flowbox 32 also includes a first side aperture 32e for receiving the first tool 34, and a second side aperture 32f for receiving the second tool 36.

The electrolyte 40 may be conveniently channeled to the flowbox 32 from the supply conduit 58 which is suitably joined in flow communication with a supply manifold 88 extending through the reference table 54 and upwardly into the flowbox back wall 32b for flow into the flowbox chamber 74. The electrolyte 40 may be discharged from the flowbox chamber 74 through a return manifold 90 also disposed in the flowbox back wall 32b and extending downwardly into the reference table 54 and joined in flow communication to the return conduit 60.

In order to seal the electrolyte 40 within the flowbox 74, which electrolyte 40 is typically provided at a high pressure as described above and is corrosive, means are provided for sealing the first and second tools 34 and 36 at the flowbox 74 for sealing leakage of the electrolyte 40 from the flowbox 74 as the first and second tools 34, 36 translate along the first and second longitudinal and transverse axes X, U, Z, and W. Sealing is desired to maintain both the driving pressure of the electrolyte 40 flowing in the gaps between the tools 34, 36 and the blade 10, and the back pressure on the electrolyte 40 leaving the gaps as is conventionally known. It is also desired to reduce, or prevent electrolyte leakage which may corrode machine components.

Figure 11:
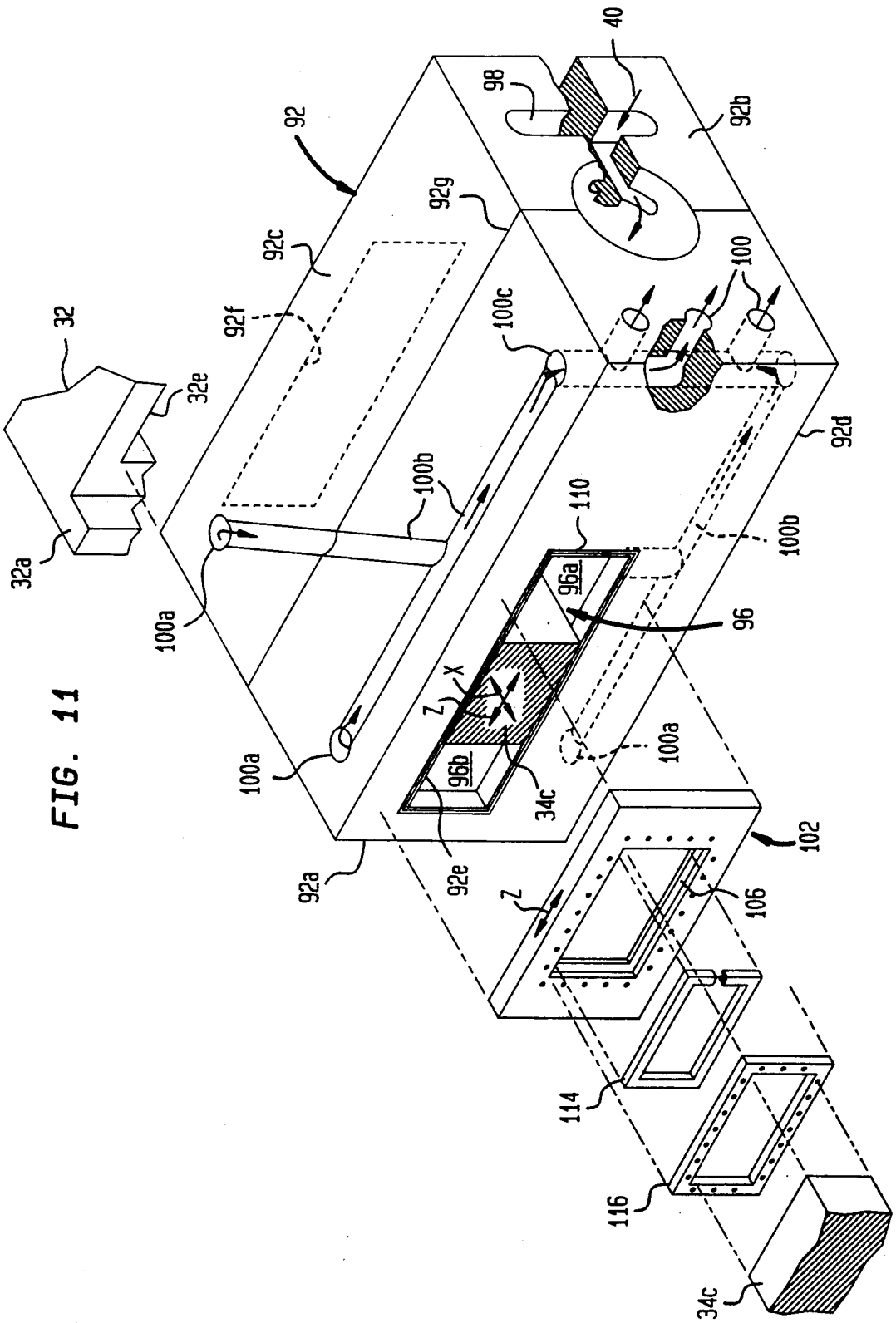
FIG. 11 is an exploded, schematic, partly sectional view of a flowdam and seals used in the flowbox illustrated in FIG. 9.

Referring to FIGS. 10 and 11, the sealing means in accordance with one embodiment of the invention include a flowdam 92 being complementary in shape to the flowbox chamber 74 which may be conveniently assembled therein (as shown in phantom in FIG. 9) by sliding through either of the flowbox side apertures 32e, 32f and is fixedly disposed therein by conventional retention plates 94 bolted to both sides of the flowbox 32. The flowdam 92, and the buss plate insulator 77, in an exemplary embodiment are formed of an electrically nonconductive and noncorrosive material such as a fiberglass/epoxy composition conventionally known as Military Specification G-10.

The flowdam 92 includes a front wall 92a, a back wall 92b, a top wall 92c, and a bottom wall 92d which define a generally rectangular inner chamber 96 having first and second flowdam side apertures 92e, and 92f, respectively. The flowdam first and second side apertures 92e, 92f are coplanar with the flowbox first and second side apertures 32e, 32f, respectively, for receiving the first and second tools 34, 36, respectively. The flowdam front wall 92a includes a central aperture 93 coaxially aligned with the flowbox front wall aperture 76, the buss plate aperture 75a, and the insulator aperture 77a, as shown in FIG. 10, for receiving and positioning the blade 10 in the flowdam chamber 96.

In the exemplary embodiment illustrated in FIGS. 9-12, the flowdam 92 is sized for tightly fitting within the flowbox chamber 74 with the outer surfaces of the flowdam front, back, top, and bottom walls 92a-92d being disposed in sealing contact with the inner surfaces of the corresponding flowbox front, back, top, and bottom walls 32a-32d. For example, a clearance of about 3-5 mils (0.076-0.127 mm) may be provided between the flowdam 92 and the flowbox 32 to ensure that it may be easily assembled while at the same time providing effective sealing of electrolyte leakage therebetween.

As illustrated in FIGS. 10 and 11, the flowdam 92 includes a flowdam inlet 98 extending through the flowdam back wall 92b which is disposed in flow communication with the supply manifold 88 for receiving the electrolyte 40 therefrom. The flowdam 92 also includes a flowdam outlet 100, in the form of three vertically spaced and horizontally extending holes, disposed through the flowdam back wall 92b in flow communication with the return manifold 90. As illustrated in FIG. 10, the flowdam back wall 92b is disposed in contact with the flowbox back wall 32b with the flowdam inlet 98 being aligned with the supply manifold 88, and the flowdam outlet 100 being aligned with complementary holes of the return manifold 90 with sealing therebetween being provided by the tight-fit tolerance therebetween.

Referring again to FIGS. 10 and 11, the flowdam front, back, top, and bottom walls 92a-92d are preferably sized for defining an inlet chamber 96a which is the back portion of the flowdam chamber 96 between the flowdam back wall 92b and the first and second tools 34, 36 for receiving the electrolyte 40 from the flowdam inlet 98, and an outlet chamber 96b, which is the front portion of the flowdam chamber 96 between the flowdam front wall 92a and the first and second tools 34, 36 for receiving the electrolyte 40 channeled over the blade 10 from the inlet chamber 96a.

Figure 12:
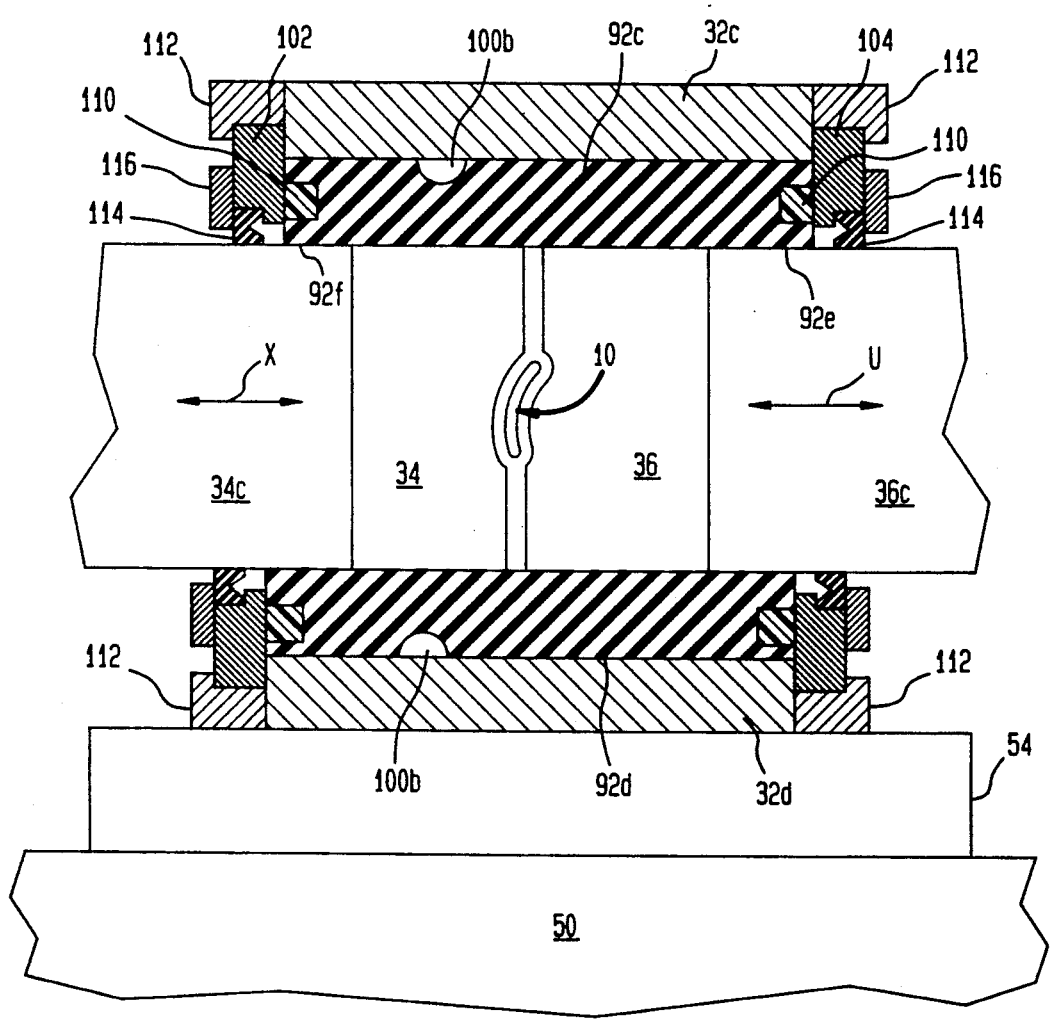
FIG. 12 is an elevation, partly sectional transverse view of the flowbox illustrated in FIG. 10 taken along line 12—12.
Figure 14:
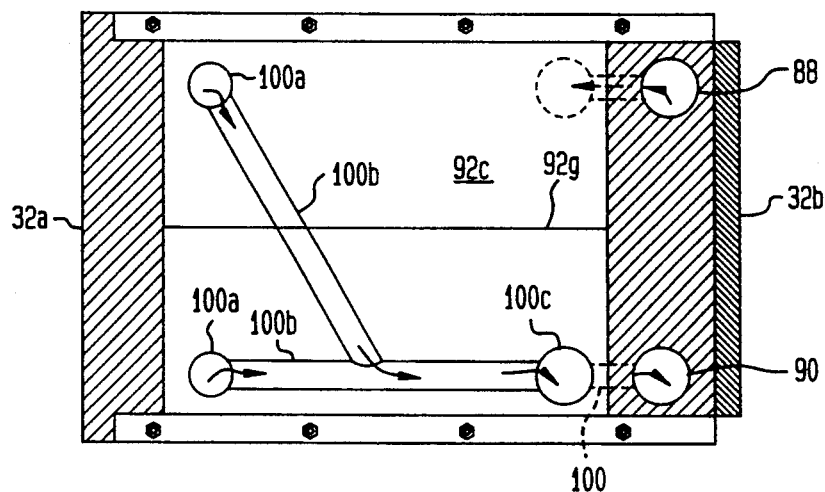
FIG. 14 is a top, partly sectional view of the flowbox illustrated in FIG. 13 taken along line 14—14.

As illustrated in FIG. 12, the flowdam top and bottom walls 92c, 92d are preferably planar, or flat, and disposed parallel to each other and in sliding sealing contact with the top and bottom surfaces of the first and second tools 34, 36 for allowing movement thereof along the first and second longitudinal and transverse axes X, U, Z, and W while sealing leakage between the first and second tools 34, 36 and the flowdam top and bottom walls 92c, 92d. The clearance therebetween may be about 3 mils (0.076 mm) for providing effective sealing while allowing sliding movement of the tools 34, 36.

Referring to FIGS. 10, 11, 13, and 14, the flow of the electrolyte 40 is therefore confined to flow from the flowdam inlet 98, to the flowdam inlet chamber 96a, between the respective airfoil workfaces of the first and second tools 34, 36 and downwardly over the airfoil 12 of the blade 10 from its tip 28 to root 30, and into the flowdam outlet chamber 96b. From the flowdam outlet chamber 96b the electrolyte 40 is channeled from at least one, and in the exemplary embodiment illustrated four flowdam discharge ports 100a extending through the flowdam top and bottom walls 92c, 92d on opposite longitudinal sides of the flowdam 92. A plurality of outlet trenches 100b are disposed in the outer surfaces of the flowdam top and bottom walls 92c, 92d for joining the discharge ports 100a at the front end of the flowdam 92 to the flowdam outlet 100 at the back end of the flowdam 92. The flowdam trenches 100b are disposed in flow communication with a vertical outlet bore 100c disposed in the flowdam back wall 92b which is joined in flow communication to the flowdam outlets 100 for returning the electrolyte 40 to the flowbox return manifold 90.

As shown in FIG. 11, the flowdam 92 may be conveniently formed in two halves, as noted by the split line 92g, so that the various apertures and trenches therein may be conveniently manufactured and then conventionally assembled together prior to being assembled as a unit by sliding into the flowbox chamber 74.

Referring again to FIGS. 10-12, first and second seal plates 102 and 104, respectively, are slidably joined to the flowbox 32 over the first and second flowdam side apertures 92e and 92f for sealing leakage of the electrolyte 40 from the flowdam chamber 96 while allowing sliding movement of the tools 34, 36 along the respective first and second longitudinal and transverse axes X, U, Z, and W. Each of the seal plates 102, 104 is generally rectangular and includes a respective first and second access hole 106 and 108 for sealingly receiving the first and second tools 34, 36, respectively, while allowing sliding movement thereof along the first and second longitudinal axes X, W, respectively.

More specifically, respective transverse seals 110 having rectangular configurations are disposed in complementary slots in the flowdam 92 around the respective first and second flowdam apertures 92e and 92f. The transverse seals 110 are preferably made from polytetrafluoroethylene (PTFE) and may be compressed in the trenches against a conventional elastic O-ring (not shown) for providing a spring force thereagainst. The seal plates 102, 104 are positioned against the transverse seals 110 and are mounted to the flowbox 32 by L-shaped retainers 112 which allow sliding movement of the seal plates 102, 104 along the respective transverse axes Z, W, with the transverse seals 110 being in contact with the inside surfaces of the seal plates 102, 104 for sealing leakage of the electrolyte 40 therepast. The seal plates 102, 104, the retainers 112, and the retention plates 94 are preferably formed from noncorrosive stainless steel.

Each of the tools 34, 36 is preferably removably joined, by bolts for example, to an enlarged first and second tool shank 34c and 36c, respectively, so that different tools 34, 36 may be interchanged on the common shanks 34c, 36c for utilizing a specific flowbox 32 for a family of blade or workpieces 10. The tool shanks 34c, 36c are rectangular in the exemplary embodiment illustrated but could have any suitable configuration including circular, for example. The tool shanks 34c, 36c are preferably larger in transverse section than the tools 34, 36 to ensure that the tools and tool shanks may be inserted through the respective access holes 106, 108 for electrochemical machining.

Respective longitudinal seals 114 are disposed in the respective access holes 106, 108 against suitable flanges therein and are retained therein by respective retainers 116 conventionally bolted thereto. The longitudinal seals 114 and the retainers 116 are rectangular in the embodiment illustrated, and the seals 114 are also preferably formed of PTFE. The longitudinal seals 114 are sized for sliding contact against the outer perimeter of the tool shanks 34c, 36c to allow longitudinal movement thereof along the respective longitudinal axes X, U while sealing leakage of the electrolyte 40 therebetween.

In this way, the first and second tools 34, 36 are allowed to translate along both the respective longitudinal and transverse axes X, Z and U, W during electrochemical machining while confining the electrolyte 40 within the flowdam chamber 96 and sealing leakage thereof from the flowdam first and second apertures 92e, 92f.

As shown in solid lines in FIGS. 3 and 4, the tools 34, 36 may be retracted completely away from the flowbox 32 for allowing ready access thereto. When the workpiece 10 is suitably secured inside the flowbox 32, the tools 34, 36 may be inserted therein as shown in phantom.

Figure 13:
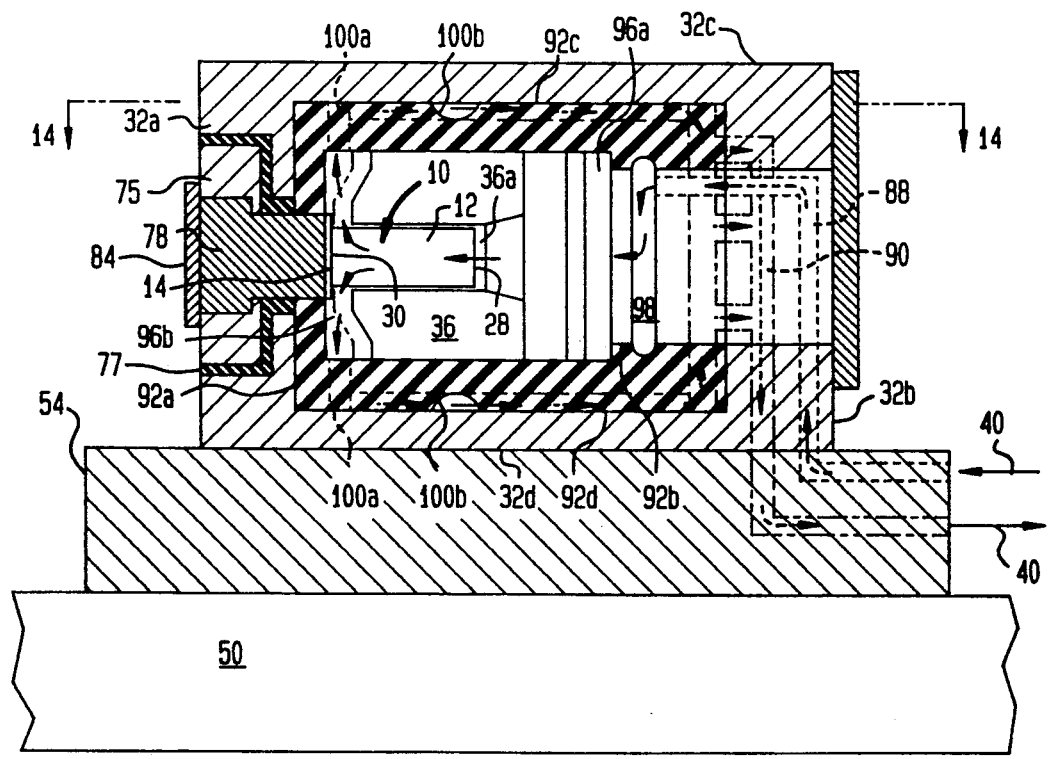
FIG. 13 is an elevational, partly sectional longitudinal view of the flowbox illustrated in FIG. 10 taken along line 13—13.

As shown in solid lines in FIGS. 10 and 13, the tools 34, 36 begin their compound travel adjacent to both the airfoil 12 and platform 14. They end their travel at the final position shown in phantom, and travel therebetween along the xz and uw vectors.

FIG. 11 additionally shows the sliding transverse movement of the first tool shank 34c in the flowdam chamber 96 from its initial position in solid line to its final position in phantom.

Of course, the tools 34, 36 may be fully withdrawn from the flowbox 32 by reverse movement thereof.

Accordingly, the improved ECM machine 44 disclosed above allows for compound translation movement of each of the first and second tools 34, 36 along the respective longitudinal and transverse axes for obtaining preselected and variable resultant feedrate vectors xz and uw. The tools 34, 36 may be controlled for obtaining identical mirror-image movement, or different movement as desired, including all possibilities available from selectively varying each of the feedrate vectors x, u, z, and w, as well as selecting the actual position of each tool 34, 36 along the axes X, U, Z, and W. For example, the initial positions of the tools 34, 36 along the respective axes may be selected for obtaining offset for machining a relative high spot on a workpiece 10.

The ECM machine 44 is relatively simple in construction and has an improved configuration for allowing access to the front and back of the flowbox 32 which may be used for advantage to install and remove the workpieces 10 from the front of the flowbox 32 while accessing the flowbox 32 from its back side to interchange the tools 34, 36 as desired as well as for maintaining or repairing the various components associated with the flowbox 32.

Furthermore, the flowbox 32, including the removable flowdam 92 therein and the seal plates 102, 104 allows for the compound movement of the tools 34, 36 while providing effective sealing of the electrolyte 40 inside the flow box 32. Sealing is effectively provided by the close machined fits of the components as described above and by the minimum use of additional seal rings such as the transverse seals 110 and the longitudinal seals 114.

Yet further, by channeling the electrolyte 40 into and from the stationary reference table 54, the flowbox 32 may be quickly and easily removed from the table 54 without requiring the additional removable and installation of electrolyte channeling conduits. The flowbox 32 is simply bolted to the table 54 with the respective portions of the supply manifold 88 and the return manifold 90 in the flowbox back wall 32b being aligned with the portions thereof in the table 54. Securing the flowbox 32 to the table 54 provides an effective contact seal therebetween for channeling the electrolyte 40 between the table 54 and the flowbox 32 without leakage.

Although the flowbox 32 described is configured for receiving a single workpiece 10, alternate embodiments of the present invention may utilize flowboxes having two or more respective flowdams therein, such as the flowdam 92 described above for simultaneously receiving two or more workpieces 10 and two or more respective pairs of tools 34, 36.

Figure 15:
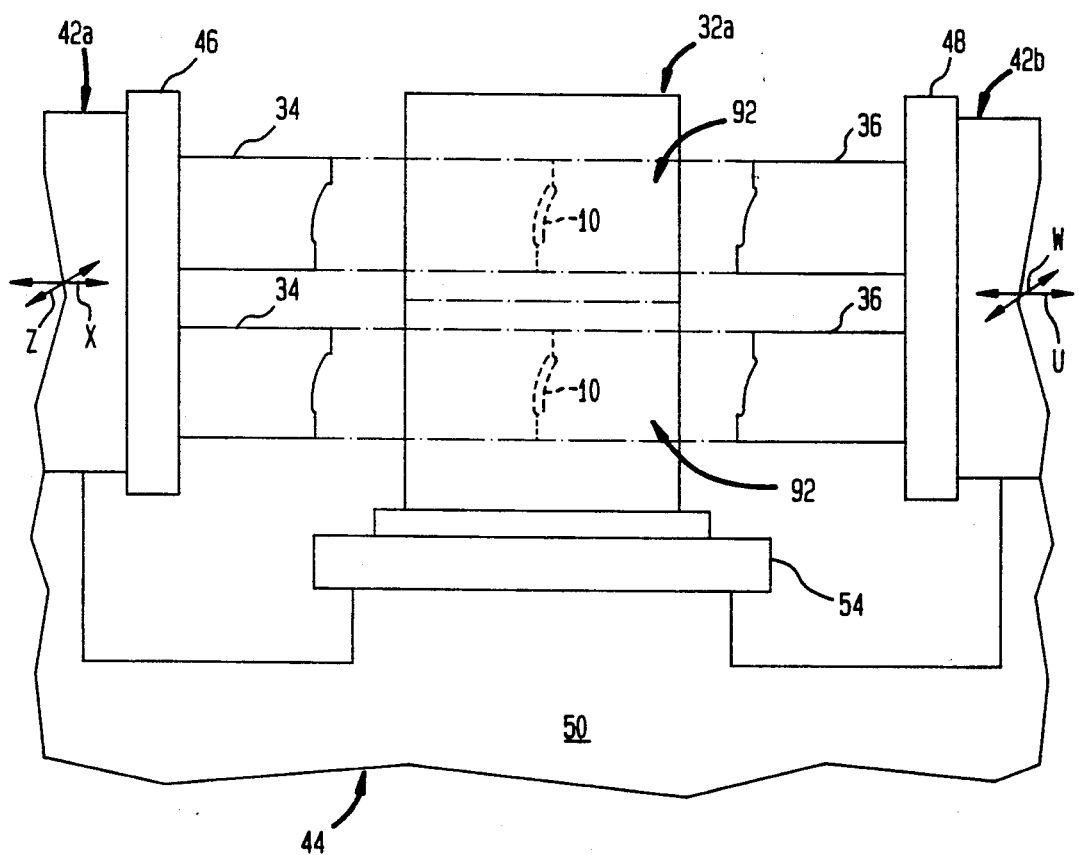
FIG. 15 is a schematic, elevational, longitudinal view of an ECM machine having a flowbox and two pairs of cathode tools in accordance with another embodiment of the present invention.

More specifically, FIG. 15 illustrates an alternate embodiment of the flowbox 32A which is also fixedly joined to the reference table 54 but includes two identical ones of the flowdams 92 stacked vertically together. A pair of identical workpieces 10 are fixedly supported in the flowbox 32A, and respective pairs of the tools 34, 36 are also suitably fixedly joined to the respective ram plates 46, 48. In this way, two identical workpieces 10 may be simultaneously electrochemically machined in the same ECM machine 44 with the tools 34, 36 being moved from outside the flowbox 32A as shown in solid line to inside the flowbox 32A as shown in phantom for electrochemical machining. Alternatively, the flowbox could also have a third flowdam 92 and respective workpiece 10, and tool pair 34, 36 for simultaneously electrochemically machining three workpieces 10 in the single ECM machine 44.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

For example, although the ECM machine 44 is configured for compound movement of the tools 34, 36 in horizontal planes, the machine may also be configured for compound movement of the tools 34, 36 in a vertical plane with the workpiece 10 being also fixedly disposed in a vertical direction. Although the workpiece 10 is disclosed as being a gas turbine engine blade or vane having a platform, other types of workpieces may be electrochemically machined in the ECM machine 44 to advantage.

Furthermore, other means could alternatively be used for translating the tools 34, 36 including conventional hydraulic actuators, for example, instead of the screws 66.

Although preferred orientations of travel of the tools 34, 36 are disclosed, i.e. X, Z and U, W, alternate orientations thereof may also be used in accordance with the invention.

Yet further, although the flowdam 92 is configured for radial flow of the electrolyte 40 over the workpiece 10, it could also be configured for other types of flow thereof including transverse, cross flow between the leading and trailing edges 20, 22 of the airfoil.

Accordingly, what is claimed and desired to be secured by Letters Patent of the United States as the invention is defined and differentiated in the following claims:

1. A method of electrochemically machining (ECM) a stationary workpiece having a stacking axis and first and second opposite sides using first and second cathode tools having first and second longitudinal and transverse axes, respectively, comprising the steps of:
   supplying a positive voltage to said workpiece and a negative voltage to said first and second tools;
   channeling an electrolyte between said workpiece and said first and second tools; and
   moving said first and second tools along said first and second longitudinal axes, respectively, toward said workpiece and substantially perpendicularly to said workpiece stacking axis, and along said first and second transverse axes, respectively, substantially parallel to said workpiece stacking axis for electrochemically machining said workpiece, said first tool being translated along said first longitudinal axis independently of translation along said first transverse axis for obtaining a selectively variable resultant feedrate direction for said first tool, and said second tool being translated along said second longitudinal axis independently of translation along said second transverse axis for obtaining a selectively variable resultant feedrate direction for said second tool.

2. An ECM method according to claim 1 wherein said workpiece includes a platform, and an airfoil extending outwardly along said stacking axis perpendicularly from said platform, and said first and second tools are translated along said first and second longitudinal axes, respectively, to electrochemically machine said airfoil, and translated along said first and second transverse axes, respectively, to electrochemically machine said platform.

3. An ECM method according to claim 2 wherein said translation of said first and second tools along said first and second longitudinal axes, respectively, is coordinated and occurs substantially simultaneously.

4. An ECM method according to claim 3 wherein said translation of said first and second tools along said first and second transverse axes, respectively, is coordinated and occurs substantially simultaneously.

5. An ECM method according to claim 4 wherein said transverse translation of said first and second tools occurs at substantially equal feedrates.

6. An ECM method according to claim 4 wherein said transverse translation of said first and second tools occurs at unequal feedrates.

7. An ECM method according to claim 4 wherein said electrolyte is channeled over said workpiece along said stacking axis.

8. An ECM method according to claim 7 wherein said platform is disposed at one end of said airfoil, and said airfoil includes a tip at an opposite end, and said electrolyte is channeled from said tip and over said airfoil toward said platform.

9. A machine for electrochemically machining (ECM) a workpiece having a stacking axis and first and second opposite sides comprising:
   means for fixedly mounting said workpiece stationary in space;
   a pair of cathode tools including:
      a first tool having a first longitudinal axis, a first transverse axis disposed substantially perpendicularly thereto, and adapted to be disposed on said workpiece first side;
      a second tool having a second longitudinal axis, a second transverse axis disposed substantially perpendicularly thereto, and adapted to be disposed on said workpiece second side; and
      said first and second longitudinal axes adapted to be disposed substantially perpendicularly to said stacking axis, and said first and second transverse axes adapted to be disposed substantially parallel to said stacking axis;
   means for supplying a positive voltage to said workpiece and a negative voltage to said first and second tools;
   means for channeling an electrolyte between said workpiece and said first and second tools; and
   means for moving said first and second tools along said first and second longitudinal axes and along said firs and second transverse axes, respectively, toward said workpiece for electrochemically machining said workpiece, said first tool being translated along said first longitudinal axis independently of translation along said first transverse axis for obtaining a selectively variable resultant feedrate direction for said first tool, and said second tool being translated along said second longitudinal axis independently of translation along said second transverse axis for obtaining a selectively variable resultant feedrate direction for said second tool.

10. An ECM machine according to claim 9 wherein said workpiece includes a platform, and an airfoil extending outwardly along said stacking axis perpendicularly from said platform, and said moving means are effective for translating said first and second tools along said first and second longitudinal axes, respectively, to electrochemically machine said airfoil, and along said first and second transverse axes, respectively, to electrochemically machine said platform.

11. An ECM machine according to claim 10 wherein said moving means are effective for translating said first and second tools along said first and second longitudinal axes, respectively, with coordinated movement of each other and substantially simultaneously.

12. An ECM machine according to claim 11 wherein said moving means are effective for translating said first and second tools along said first and second transverse axes, respectively, with coordinated movement of each other and substantially simultaneously.

13. An ECM machine according to claim 12 wherein said moving means are effective for translating said first and second tools along said first and second transverse axes, respectively, at substantially equal feedrates.

14. An ECM machine according to claim 12 wherein said moving means are effective for translating said first and second tools along said first and second transverse axes, respectively, at unequal feedrates.

15. An ECM machine according to claim 12 wherein said electrolyte channeling means are effective for channeling said electrolyte over said workpiece along said stacking axis.

16. An ECM machine according to claim 15 wherein said platform is disposed at one end of said airfoil, and said airfoil includes a tip at an opposite end, and said electrolyte is channeled from said tip and over said airfoil toward said platform.

17. An ECM machine according to claim 12 wherein said moving means include:
   a first cross-slide having a first ram plate movable along said first longitudinal and transverse axes, and said first tool is fixedly mounted to said first ram plate for movement therewith; and
   a second cross-slide having a second ram plate movable along said second longitudinal and transverse axes, and said second tool is fixedly mounted to said second ram plate for movement therewith.

18. An ECM machine according to claim 17 wherein:
   said first cross-slide includes a first longitudinal ram movable along said first longitudinal axis, and a first transverse ram movable along said first transverse axis; and
   said second cross-slide includes a second longitudinal ram movable along said second longitudinal axis, and a second transverse ram movable along said second transverse axis.

19. An ECM machine according to claim 18 wherein:
   said first longitudinal ram is slidably mounted to a frame, said first transverse ram is slidably mounted to said first longitudinal ram, and said first ram plate is fixedly mounted to said first transverse ram; and
   said second longitudinal ram is slidably mounted to said frame, said second transverse ram is slidably mounted to said second longitudinal ram, and said second ram plate is fixedly mounted to said second transverse ram.

20. An ECM machine according to claim 18 wherein:
   said first transverse ram is slidably mounted to a frame, said first longitudinal ram is slidably mounted to said first transverse ram, and said first ram plate is fixedly mounted to said first longitudinal ram; and
   said second transverse ram is slidably mounted to said frame, said second longitudinal ram is slidably mounted to said second transverse ram, and said second ram plate is fixedly mounted to said second longitudinal ram.

21. An ECM machine according to claim 17 wherein said workpiece mounting means include:
   a reference table fixedly mounted to a frame and disposed between said first and second cross-slides; and
   a flowbox fixedly mounted to said table and including an inner chamber, a front aperture for fixedly supporting said workpiece in said chamber, a first side aperture for receiving said first tool and a second side aperture for receiving said second tool.

22. An ECM machine according to claim 21 wherein said flowbox further includes means for sealing said first and second tools at said flowbox for sealing leakage of said electrolyte from said flowbox as said first and second tools translate along said first and second longitudinal and transverse axes.

23. An ECM machine according to claim 22 wherein said sealing means include:
   a flowdam fixedly disposed inside said flowbox chamber and having front, back, top, and bottom walls disposed in sealing contact with said flowbox, an inner chamber defining first and second flowdam side apertures for receiving said first and second tools, respectively, and said flowdam front wall including a central aperture aligned with said front aperture for receiving said workpiece; and
   first and second seal plates slidably joined to said flowbox over said first and second flowdam side apertures, respectively, for sealing leakage of said electrolyte from said flowdam chamber while allowing sliding movement thereof along said first and second transverse axes, respectively, each of said first and second seal plates including a respective first and second access hole for sealingly receiving said first and second tools, respectively, while allowing sliding movement thereof along said first and second longitudinal axes, respectively.

24. An ECM machine according to claim 23 wherein said flowdam front, back, top, and bottom walls are sized for defining an inlet chamber portion of said flowdam chamber between said back wall and said first and second tools for receiving said electrolyte, an outlet chamber portion of said flowdam chamber between said front wall and said first and second tools for receiving said electrolyte channeled over said workpiece from said inlet chamber; and said top and bottom walls are planar, parallel to each other and disposed in sliding sealing contact with said first and second tools for allowing movement thereof along said first and second transverse axes while sealing leakage between said first and second tools and said top and bottom walls.

25. An ECM machine according to claim 24 wherein said electrolyte channeling means include:
   a flowdam inlet extending through said flowdam back wall in flow communication with said inlet chamber for channeling said electrolyte thereto; and
   a discharge port disposed through at least one of said flowdam top and bottom walls in flow communication with said outlet chamber for discharging said electrolyte therefrom.

* * * * *